(12) United States Patent
Ofir

(10) Patent No.: US 12,259,554 B2
(45) Date of Patent: Mar. 25, 2025

(54) SUPERIMPOSED DIFFRACTIVE GRATINGS FOR OPTICAL ELEMENTS OF AUGMENTED REALITY AND VIRTUAL REALITY DISPLAYS

(71) Applicant: Adeia Guides Inc., San Jose, CA (US)

(72) Inventor: Yuval Ofir, Kfar Ha-Oranim (IL)

(73) Assignee: Adeia Guides Inc., San Jose, CA (US)

( * ) Notice: Subject to any disclaimer, the term of this patent is extended or adjusted under 35 U.S.C. 154(b) by 54 days.

(21) Appl. No.: 17/825,486

(22) Filed: May 26, 2022

(65) Prior Publication Data

US 2023/0384593 A1 Nov. 30, 2023

(51) Int. Cl.
  *G02B 27/01* (2006.01)
  *F21V 8/00* (2006.01)
  *G02B 27/09* (2006.01)

(52) U.S. Cl.
  CPC ....... *G02B 27/0172* (2013.01); *G02B 6/0016* (2013.01); *G02B 6/003* (2013.01); *G02B 6/0038* (2013.01); *G02B 27/0944* (2013.01); *G02B 2027/0112* (2013.01); *G02B 2027/0123* (2013.01)

(58) Field of Classification Search
  CPC ........ G02B 2027/0112; G02B 27/0944; G02B 6/003
  See application file for complete search history.

(56) References Cited

U.S. PATENT DOCUMENTS

| | | | |
|---|---|---|---|
| 10,935,730 B1 | 3/2021 | Lou et al. | |
| 2019/0339449 A1* | 11/2019 | Shipton | G02B 6/122 |
| 2020/0158942 A1* | 5/2020 | Yang | G02B 6/0036 |
| 2021/0063634 A1 | 3/2021 | Waldern et al. | |
| 2021/0382212 A1 | 12/2021 | Sell et al. | |
| 2022/0146831 A1* | 5/2022 | Deng | G02B 6/0035 |

FOREIGN PATENT DOCUMENTS

WO  2005024491 A1  3/2005

* cited by examiner

*Primary Examiner* — Sung H Pak
(74) *Attorney, Agent, or Firm* — Haley Guiliano LLP

(57) ABSTRACT

Head-mounted displays with waveguides comprising superimposed diffractive gratings and methods for fabricating said waveguides are described herein. In an embodiment, a head-mounted display comprises an optical element and an image source that provides an image beam to an optical element. The optical element comprises two gratings superimposed over each other, at least one of which comprising a buried diffractive grating. The buried diffractive grating comprises a high-refractive index material interspersed with a low-refractive index material or non-solid pockets, such as gas, air or vacuum. Light diffracted by a first of the two gratings is further diffracted by a second of the two gratings without interacting with a surface of the optical element between diffractions.

22 Claims, 12 Drawing Sheets

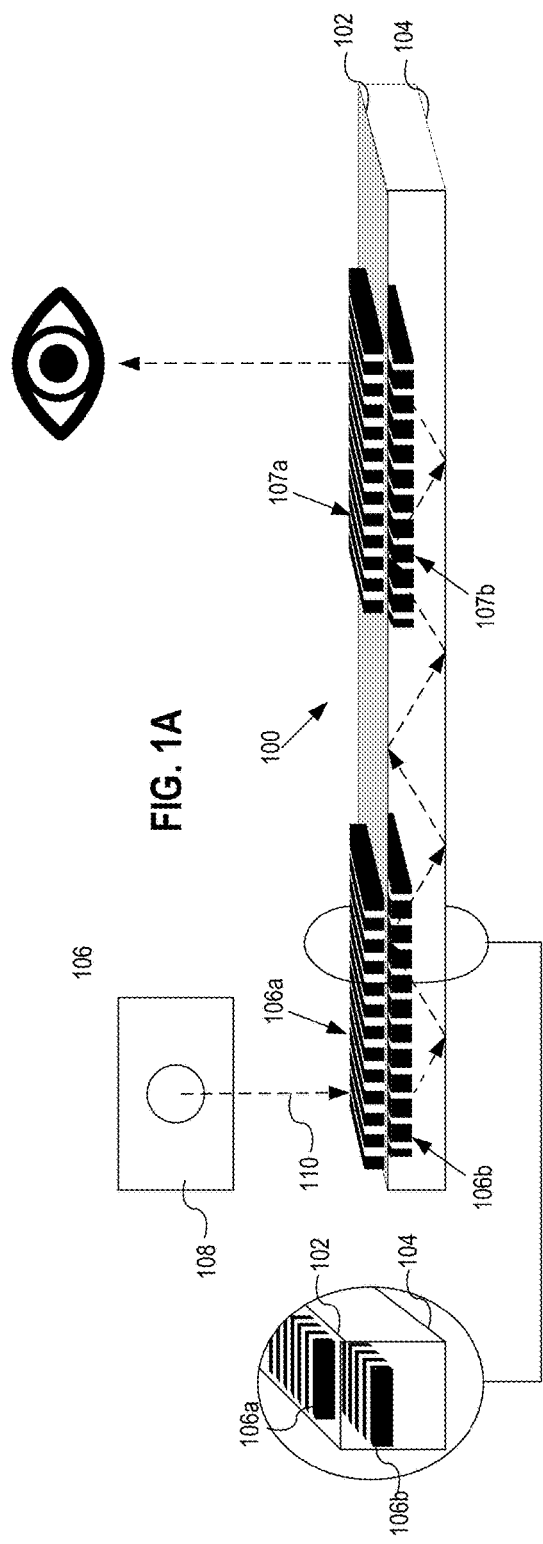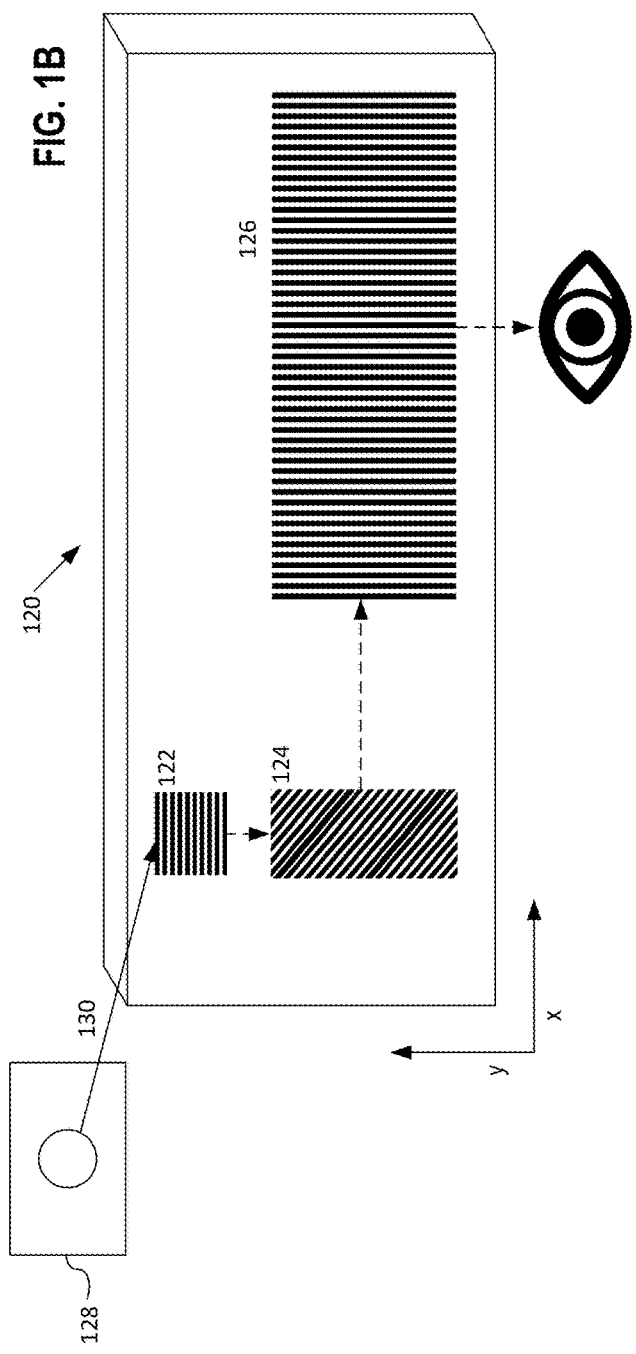

550

560

570

580

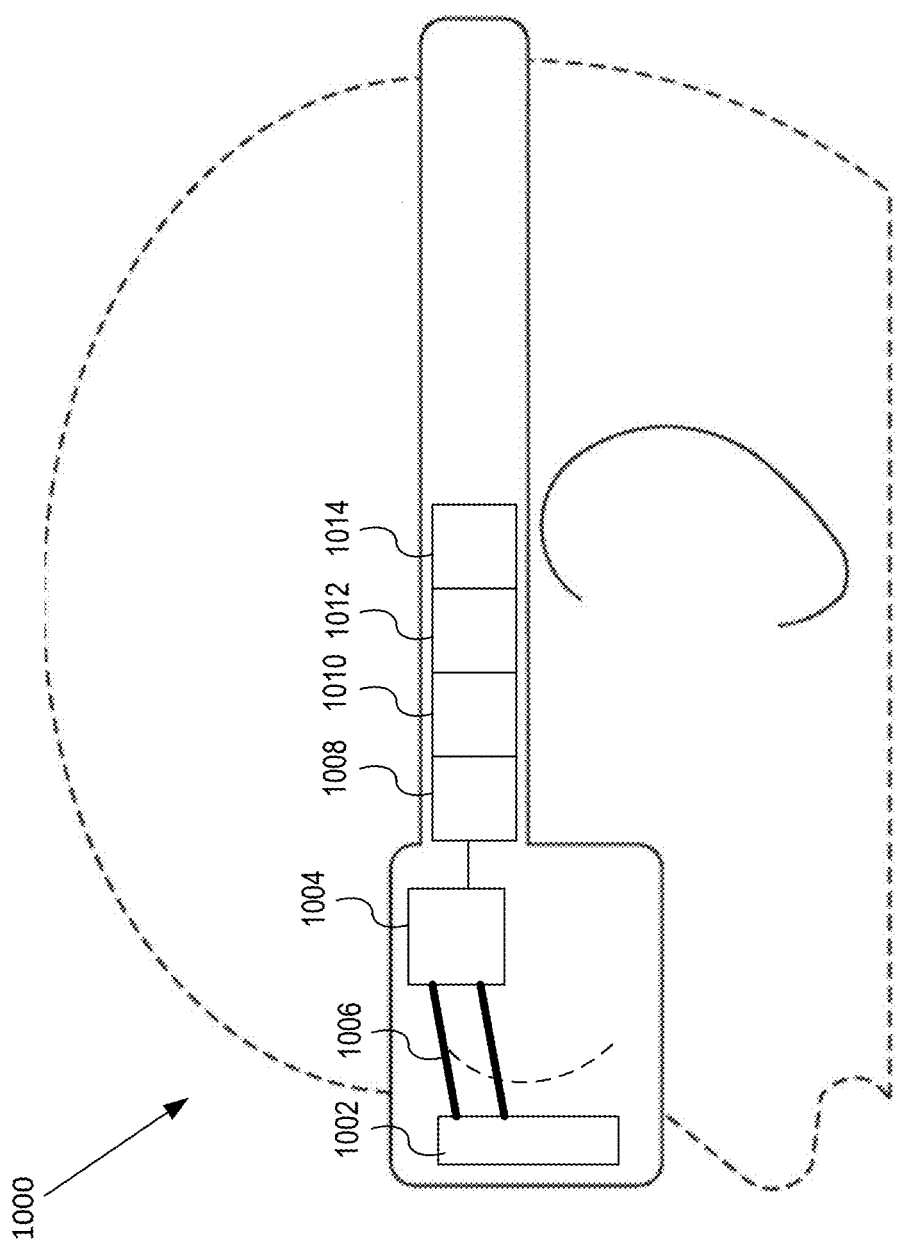

SUPERIMPOSED DIFFRACTIVE GRATINGS FOR OPTICAL ELEMENTS OF AUGMENTED REALITY AND VIRTUAL REALITY DISPLAYS

BACKGROUND

This disclosure is generally directed to optical elements. In particular, the present disclosure relates to superimposed diffractive gratings for use in optical equipment (e.g., for optical devices in augmented and virtual reality head-mounted displays).

SUMMARY

Virtual reality (VR) and augmented reality (AR) systems are becoming increasingly more common in the modern world. A large focus of modern technology is to create head-mounted displays (HMDs) or near-eye displays (NEDs) that create virtual images in a field-of-view of one or more eyes of a user. In some approaches, head-mounted displays include waveguides made from glass or plastic which diffract light from an image source to an eye of the user. The waveguides may be implemented in lenses of glasses that are attached to the image source. To diffract the light, waveguides include diffractive gratings, such as an input coupler (in-coupling) grating and an output coupler (out-coupling) grating.

One approach to diffractive gratings is the surface relief grating which uses structures on the surface of the waveguide to diffract light based on differences in the refractive indices between the structures and the surrounding air. As the difference in refractive indices between the structures and the air increase, the angle by which the image beam is diffracted increases as well, thereby reducing the number of times the beam reflects through the waveguide before being diffracted out through the out-coupling grating and increasing the quality of the produced image. Thus, manufactures of waveguides often work to increase the difference between the refractive indices of the structures and the surrounding air by using materials for the structures that have a high refractive index.

Unfortunately, materials with high refractive indices can be expensive, difficult to work with, rarer, or difficult to manufacture. Additionally, even the best materials currently available for creating diffractive gratings can be improved with respect to the diffraction of the image beam. Additionally, optimizing the difference in refractive indices through use of high-refractive index materials limits the types of materials that can be used, thereby removing materials which could provide different benefits, such as transparent conductive materials which can be used to absorb unpolarized or polarized light.

To improve the diffraction of light by the diffractive gratings, superimposed diffractive gratings are described herein. The superimposed diffractive gratings include two diffractive gratings including at least one buried diffractive grating and a second diffractive grating situated at least in part above the buried diffractive grating (e.g., located less deep into substrate of the optical element). In some embodiments, the second diffractive grating comprises a surface relief grating on a flat surface of the waveguide. In some embodiments, the second diffractive grating comprises a second buried diffractive grating. When light hits the first of the two diffractive gratings, it diffracts at a first angle. When used as an in-coupling grating, light diffracted from the second diffractive grating is further diffracted by the first diffractive grating prior to being reflected from the surfaces of the waveguide. When used as an out-coupling grating, light diffracted from the first diffractive grating is further diffracted by the second diffractive grating prior to exiting the waveguide. By superimposing the two gratings, diffraction of light for high-refractive materials can be increased and/or materials with a lower refractive index can be used to produce a same effect. Additionally, by superimposing two diffractive gratings, different types of structures can be used in combination, such as a slanted structure used in combination with a straight structure. The superimposed diffractive gratings can be used for the in-coupling grating, out-coupling grating, expansion grating, other grating, or any combination thereof.

The buried diffractive grating comprises a high-refractive index material interspersed with a low-refractive index material or non-solid pockets, such as gas, air or vacuum. The high-refractive index material comprises a material with a refractive index above 1.6, such as a high refractive index glass, a high refractive index resin, cubic zirconium oxide, titanium oxide, aluminum oxide, diamond, hafnium oxide, tantalum oxide, or zinc oxide. In some embodiments, the refractive index of the high-refractive index material is within a range of 1.8-2.1. The low-index material may include any of lithium fluoride, calcium fluoride, magnesium fluoride, or any other low refractive index optical resin. The buried diffractive grating may be used as one or more of an in-coupling grating, an outcoupling grating, an expansion grating, or any other diffractive grating used in conjunction with a head-mounted display.

One method of producing the superimposed diffractive gratings comprises patterning a sacrificial material on a surface of a transparent material, such as glass or plastic. The sacrificial material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide. The sacrificial material is then removed through a process of sintering or dissolution to form nonsolid pockets within the optical waveguide. A second diffractive grating is then patterned on top of the coating.

Another method of producing the superimposed diffractive gratings in the waveguide comprises patterning a low-index material, such as lithium fluoride, calcium fluoride, magnesium fluoride, or any other low refractive index optical resin, on a surface of a transparent material, such as glass or plastic. The low-index material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide or a relevant high refractive index resin. A second diffractive grating is then patterned on top of the coating.

Another method of producing the superimposed diffractive gratings in the waveguide comprises fabricating a grating onto a transparent material, such as through various lithographic techniques. A flat piece of transparent material of a desired thickness is then bonded to the top of the grating, such as through glass laser bonding. An additional processing step may include thinning the flat piece of glass to the desired thickness. A second diffractive grating is then patterned on top of the transparent material.

In some embodiments, one or more of the surface relief grating or the buried diffractive grating is fabricated using a transparent conductive material. The transparent conductive material comprises a material designed to absorb certain polarization light while also comprising a high enough refractive index that it can be used to diffract light. Examples of transparent conduct materials include transparent conductive oxides, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or conductive polymers, such as poly(3,4-ethylenedioxythiphene) (PEDOT) or poly(3,4-ethylenedioxythiophene):poly(styrene sulfonate) (PEDOT: PSS). In some embodiments, the transparent conductive material is used to create an in-coupling grating to reduce incoming stray light from the image source by absorbing unwanted polarizations. In some embodiments, the transparent conductive material is used to create an out-coupling grating to reduce stray light from external sources and/or to reduce the stray light diffracted to an eye of the user through the out-coupling grating, by absorbing unwanted polarizations. Other embodiments may use diffractive gratings as any of the diffractive gratings of the waveguide and/or multiple diffractive gratings of the waveguide.

The present disclosure addresses the problems of difficulties diffracting light through waveguides. By using superimposed diffractive gratings, cheaper materials with lower diffractive indices can be used to the same effect as the higher refractive index materials and higher refractive index materials can be used to greater effect. Additionally, different materials which provide other benefits, such as transparent conductive materials which may act as a polarizer, can be used without negatively impacting the diffraction of light through the waveguide.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A depicts a diagram of an optical element of a head-mounted display comprising a waveguide with a superimposed diffractive grating.

FIG. 1B depicts a diagram of a plurality of diffraction gratings of an optical element of a head-mounted display.

FIG. 10 depicts an example of a head-mounted display comprising one or more optical elements with a superimposed diffractive grating.

DETAILED DESCRIPTION

Figure 1C:
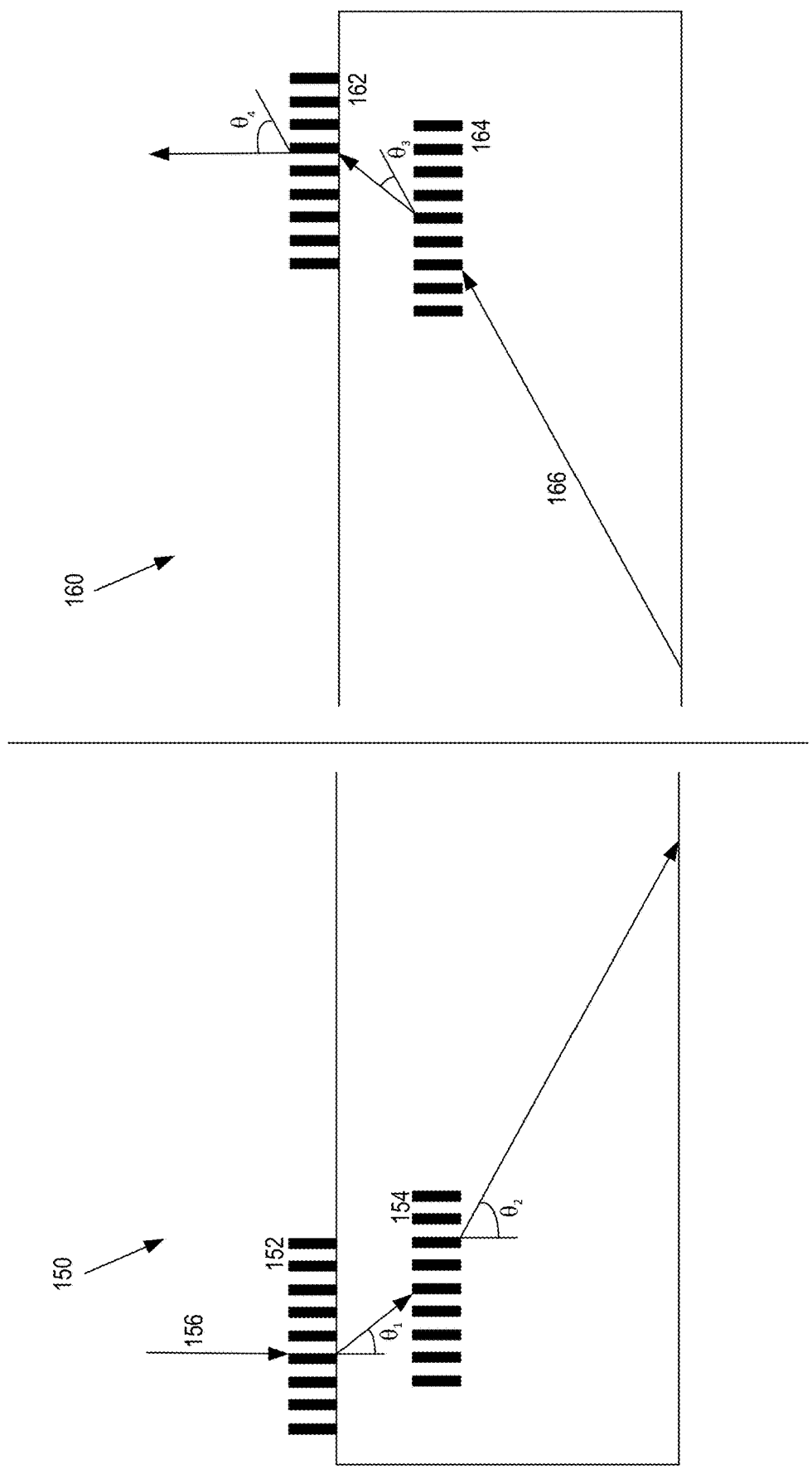
FIG. 1C depicts a diagram of operation of optical elements of a head-mounted display comprising a superimposed diffractive grating.

FIG. 1A depicts a diagram of an optical element of a head-mounted display comprising a waveguide with a superimposed diffractive grating. Optical element 100 comprises a first flat surface 102 that is substantially parallel to a second flat surface 104. The first flat surface 102 and second flat surface 104 may comprise a same material, such as glass or plastic, or different materials with substantially equal refractive indices. As used herein, a first refractive index is substantially equal to a second refractive index if the refractive indices differ by less than 0.01. In some embodiments, the refractive indices differ by less than 0.001. In some embodiments, the refractive indices differ by less than 0.0001. In some embodiments, the first material is a glass or plastic and the second material is a coating that has a refractive index that is substantially equal to the refractive index of the first material.

Optical element 100 comprises a first superimposed diffractive grating 106 comprising a surface relief grating 106a on top of the first flat surface 102 and a buried diffractive grating 106b between the first flat surface 102 and the second flat surface 104, such that the buried diffractive grating is spaced from the first surface and the second surface. For example, the surface relief grating 106a may overlap the buried diffractive grating 106b (e.g., the surface relief grating 106a may be placed less deep into the substrate of optical element 100). Methods for creating a superimposed grating comprising a surface relief grating 106a on top of the first flat surface 102 and a buried diffractive grating 106b between the first flat surface 102 and the second flat surface 104 are described further herein. Optical element 100 additionally comprises a second superimposed diffractive grating 107 comprising a surface relief grating 107a and a buried diffractive grating 107b between the first flat surface 102 and the second flat surface 104, such that the buried diffractive grating is spaced from the first surface and the second surface. For example, the surface relief grating 107a may overlap the buried diffractive grating 107b (e.g., the surface relief grating 107a may be placed less deep into the substrate of optical element 100).

While FIG. 1 depicts both the in-coupling grating and out-coupling grating as superimposed diffractive gratings, embodiments may include an optical element that comprises a superimposed diffractive grating as an in-coupling grating, out-coupling grating, expansion grating, or any combination thereof.

As shown in the cross section of buried diffractive grating 106 the buried diffractive gratings of the superimposed gratings each comprise a plurality of pockets of low refractive index material (e.g., shaded sections of 106, 107) interspaced with high refractive index material (e.g., non-shaded sections of 106, 107). The low refractive index material may include solid materials with relatively low refractive indices, such as lithium fluoride, calcium fluoride, magnesium fluoride, or optical resins, or nonsolid pockets, such as pockets of air, vacuum, or gas. The high refractive index material comprises a material that has a refractive index substantially equal to the refractive index of the material of the first surface and/or the second surface. In some embodiments, the high refractive index material is a same material as the first surface and/or second surface, such as glass or plastic. In other embodiments, the high refractive index material is a different material than one or more of the surfaces, such as a coating material. The coating material may comprise any of cubic zirconium oxide, titanium oxide, aluminum oxide, diamond, hafnium oxide, tantalum oxide, zinc oxide, or other high-index resins.

In some embodiments, the high refractive index material of the buried diffractive grating comprises a transparent conductive material. The transparent conductive material may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly(3,4-ethylenedioxythiophene):poly(styrene sulfonate) (PEDOT:PSS). In some embodiments, the surface relief grating is fabricated using a transparent conductive material. In some embodiments, both the surface relief grating and the buried diffractive grating are manufactured using a transparent conductive material.

FIG. 1A depicts the surface relief grating as a uniform vertical structure with even spacing for the purpose of providing a clear example. FIG. 1-7 are provided as representations of the methods and systems described herein. The elements of FIG. 1-7 are not intended to provide to-scale examples of the methods and systems described herein and embodiments may include different orientations of elements, different sizing of elements, different spacing of elements, or other different configurations of elements. The methods described herein may be used to generate superimposed diffractive gratings in a variety of different shapes and structures, including blazed structures, slanted structures, binary structures, analogue structures, varying depth structures, or a combination thereof with a surface relief grating different in shape and/or structure from a buried diffractive grating beneath it. Additionally, the diffractive gratings may utilize different types of spacings, such that the low refractive index material and high refractive index material sections have different widths.

An image source 108 provides an image beam to the optical element 100. The image source may comprise a device configured to project an image beam 110 comprising beams of light corresponding to a plurality of pixels that are to be displayed as an image. The image beam 110 is diffracted by the in-coupling grating and guided through the waveguide through total internal reflection across the first flat surface 102 and the second flat surface 104. The image beam is then diffracted by an out-coupling grating to be displayed to an eye of a user. In this manner, the optical element propagates the image beam through the waveguide and directs the image beam through a surface of the waveguide towards an eye of a user, thereby converting the image beam into an image for viewing by the user.

FIG. 1B depicts a diagram of a plurality of diffraction gratings of an optical element of a head-mounted display. Optical element 120 comprises in-coupling grating 122, expansion grating 124, and out-coupling grating 126. Any of in-coupling grating 122, expansion grating 124, and out-coupling grating 126 may comprise superimposed diffractive gratings, surface relief gratings, or buried diffractive gratings as described herein. While FIG. 1B depicts three diffractive gratings, other embodiments may include more or less diffractive gratings. For example, an optical element may include a plurality of expansion gratings including a first expansion grating that expands the image beam in a first direction and a second expansion grating that expands the image beam in a second direction perpendicular to the first direction.

The image source 128 transmits the image beam 130 into optical element 120 at in-coupling grating 122. In-coupling grating 122 diffracts the image beam along optical element 120 through total internal reflection towards expansion grating 124. Expansion grating 124 comprises a grating configured to expand an incoming beam in the plane of the waveguide. The expansion grating may also be configured to redirect the image beam to another direction. For example, in FIG. 1B, the expansion grating redirects the incoming beam from the x-direction to the y-direction towards the out-coupling grating. The out-coupling grating is configured to diffract the expanded beam towards an eyeball of a wearer of the head-mounted display, such as head-mounted display 700 of FIG. 7. In some embodiments, the out-coupling grating is further configured to expand the image beam, such as in a direction perpendicular to the direction expanded by the expansion grating. Thus, if the expansion grating expands the image beam in the x-direction, the out-coupling grating may be configured to expand the image beam in the y-direction, wherein the z-direction is perpendicular to the optical element in a direction of the user's eye.

FIG. 1C depicts a diagram of operation of optical elements of a head-mounted display comprising a superimposed diffractive grating. Optical element 150 comprises an optical element with a superimposed diffractive grating used as an in-coupling grating. Optical element 160 comprises an optical element with a superimposed diffractive grating used as an out-coupling grating. The diagrams of optical element 150 and optical 160 are provided as a visualization of the optical elements and the location, size, and scaling of the diffractive gratings may differ in different implementations. Additionally, while optical element 150 and optical element 160 depict only an in-coupling grating and out-coupling grating respectively, the use of a superimposed diffractive grating as described herein may be applied to any of the diffractive gratings or combination of diffractive gratings in the waveguide.

Optical element 150 comprises surface relief grating 152 and buried diffractive grating 154 as an in-coupling grating. Image beam 156 is projected from an image source in a first direction. When the image beam 156 reaches the surface relief grating 152, the image beam 156 is diffracted at an angle $\theta_1$ from the first direction. When the image beam 156 reaches the buried diffractive grating, the image beam is further diffracted to an angle $\theta_2$ from the first direction. Optical element 160 comprises surface relief grating 162 and buried diffractive grating 164 as an out-coupling grating. Image beam 166 travels through the waveguide through total internal reflected and is reflected towards the out-coupling grating at a second direction. When the image beam 166 reaches the buried diffractive grating 164, the image beam 166 is diffracted at an angle $\theta_3$ from the second direction. When image beam 166 reaches the surface relief grating 162, the image beam is further diffracted to an angle $\theta_4$ from the second direction.

FIGS. 2-5 depict different methods of creating superimposed diffractive gratings for use in optical elements for head-mounted displays. The superimposed diffractive gratings of FIG. 1 may be generated using any of the methods described in FIGS. 2-5.

Figure 2:
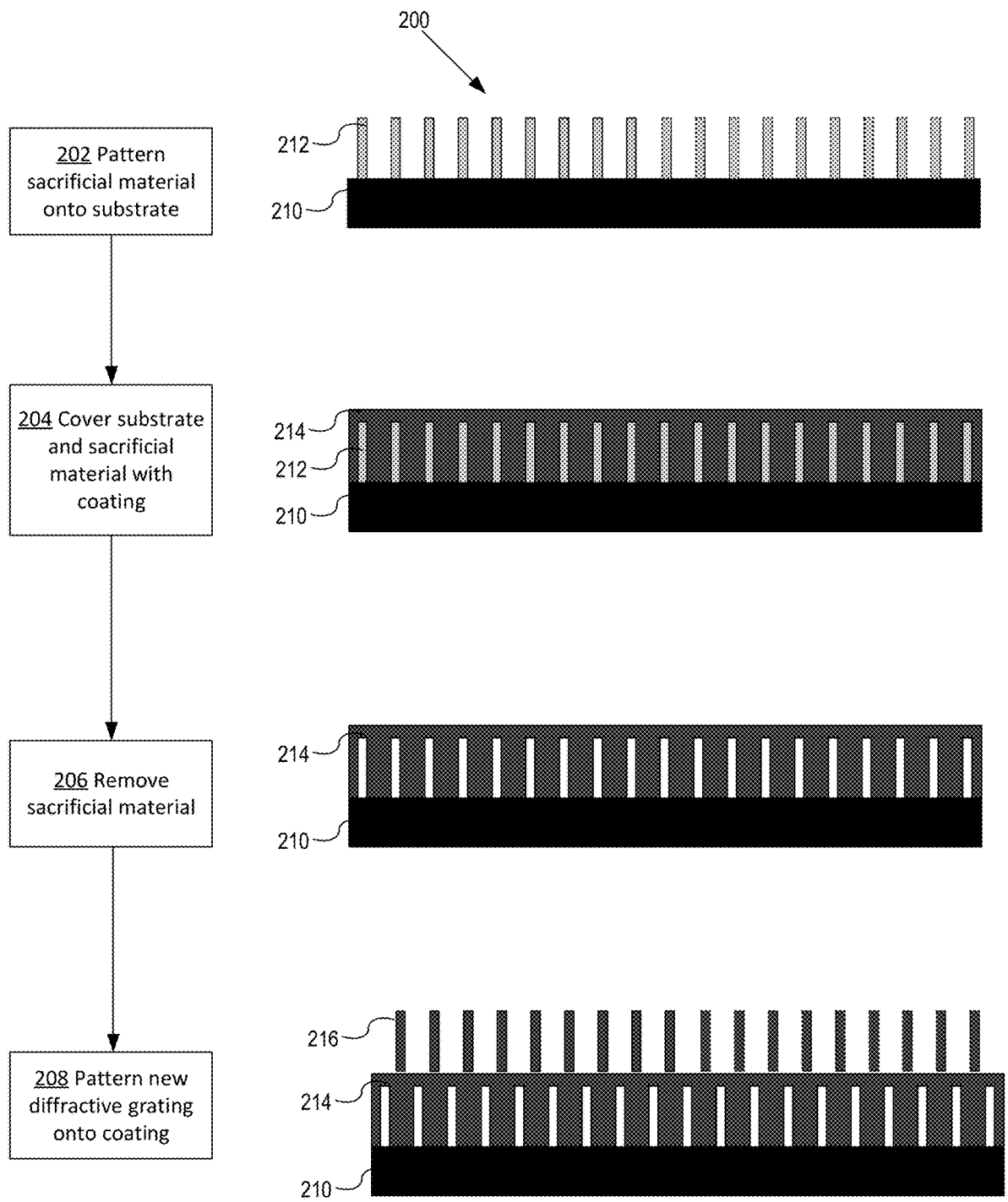
FIG. 2 depicts an example of fabricating a superimposed diffractive grating in an optical element using sacrificial material.

FIG. 2 depicts an example of fabricating a superimposed diffractive grating in an optical element using sacrificial material. Optical element 200 includes substrate 210. Substrate 210 may comprise a material with a high refractive index for fabricating the buried diffractive grating onto, such as glass or plastic. At step 202, sacrificial material 212 is patterned onto the substrate. Sacrificial material 212 may comprise a soluble or dissolvable material, such as a photoresist, a water-soluble polymer or material, or organic-solvent soluble polymer or material. One example of sacrificial material includes water soluble polyvinyl alcohol.

The sacrificial material 212 may be patterned onto substrate 210 in any of a plurality of designs, including blazed patterns, slanted patterns, binary patterns, analogue structures, or varying depth structures. Techniques for patterning sacrificial material 212 onto substrate 210 include any of electron beam lithography, interference lithography, nanoimprint lithography, hot embossing, photolithography, focused ion beams, or any other lithography or patterning techniques.

At step 204, a high index coating 214 is applied to cover sacrificial material 212 and substrate 210. High index coating 214 may comprise any of cubic zirconium oxide, titanium oxide, aluminum oxide, diamond, hafnium oxide, tantalum oxide, zinc oxide, or any other high-index resins. In some embodiments, high index coating 214 is selected to have a refractive index that is substantially equal to the refractive index of substrate 210. Processes for coating the high-index coating onto the sacrificial material 212 and substrate 210 include any of physical vapor deposition, atomic layer deposition, chemical vapor deposition, application of nanoparticle inks, spin coating, or dip-coating.

At step 206, after the high index coating has been applied to cover sacrificial material 212 and substrate 210, the sacrificial material is removed. For example, a sintering or dissolution process may be applied to optical element 200 to remove sacrificial material.

At step 208, a new diffractive grating 216 is patterned on top of the coating 214. The new diffractive grating 216 may be patterned onto coating 214 in any of a plurality of designs, including blazed patterns, slanted patterns, or binary patterns, analogue structures. The design of the new diffractive grating 216 may be a same design as the design of the sacrificial material 212 or a different design. Techniques for patterning new diffractive grating 216 onto coating 214 include any of electron beam lithography, interference lithography, nanoimprint lithography, hot embossing, photolithography, focused ion beams, or any other lithography or patterning techniques. In some embodiments, the new diffractive grating 216 is fabricated using a transparent conductive material.

While FIG. 2 depicts the sacrificial material being separately patterned on, other embodiments may include different processes for creating patterns of sacrificial materials on substrate 210. For example, the sacrificial material may be applied to cover optical element 200 in a single layer. A stamp may then be pressed onto the sacrificial material to create the pattern depicted in FIG. 2. While the stamp is in place, ultra-violent nanoimprint lithography or thermal nanoimprint lithography may be used to harden the sacrificial material into place. The stamp may then be removed, thereby leaving a structure with a pattern of sacrificial material similar to the structure made through patterning of sacrificial material. Steps 204 and 206 may then proceed in the same way as described with respect to FIG. 2.

Figure 3:
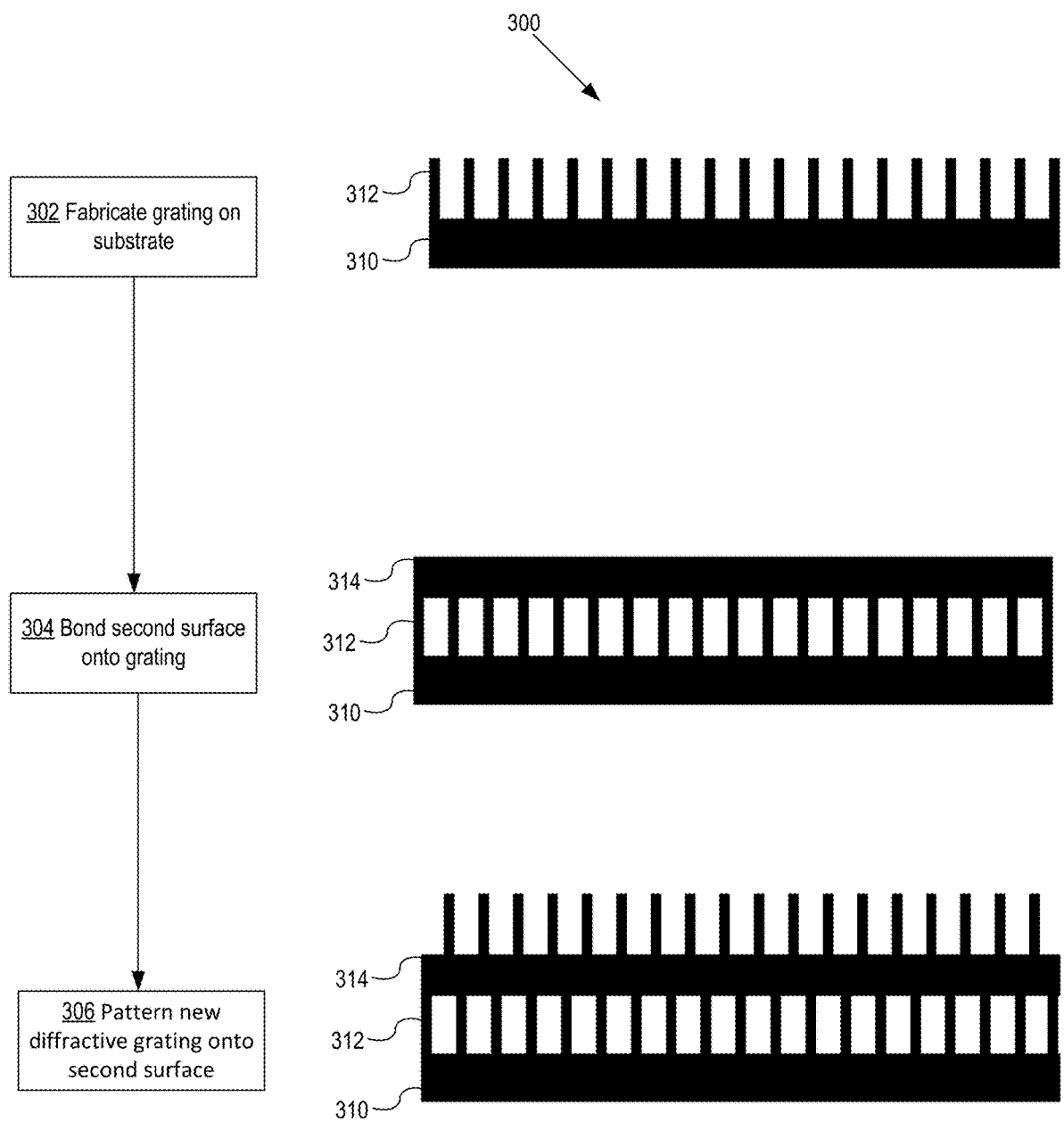
FIG. 3 depicts an example of fabricating a superimposed diffractive grating in an optical element using direct laser bonding.

FIG. 3 depicts an example of fabricating a superimposed diffractive grating in an optical element using laser bonding. Optical element 300 includes substrate 310. Substrate 310 may comprise a material with a high refractive index for fabricating the buried diffractive grating onto, such as glass or plastic. At step 302, grating 312 is fabricated onto substrate 310. For example, a standard surface relief grating may be fabricated onto the surface of substrate 310, such as through laser etching/ablation.

At step 304, a second surface 314 is bonded onto the grating to generate a buried diffractive grating via laser direct bonding in an adhesive-free process. The second surface 314 may comprise a material with a substantial equal refractive index as the first material. In some embodiments, the second surface 314 is a same material as substrate 310. For example, both materials may be glass with a same refractive index. The second surface may be attached to the first surface and grating through any bonding techniques, such as direct glass laser bonding.

At step 306, a new diffractive grating 316 is fabricated onto the second surface 314. For example, a standard surface relief grating may be fabricated onto the surface of second surface 314, such as through laser etching/ablation. In some embodiments, the surface relief grating comprises a high index material that is patterned onto the second surface using any of the techniques previously described herein. In some embodiments, the high index material comprises a transparent conductive material. The design of the new diffractive grating 316 may be a same design as the design of the grating 312 and/or a different design.

Figure 4:
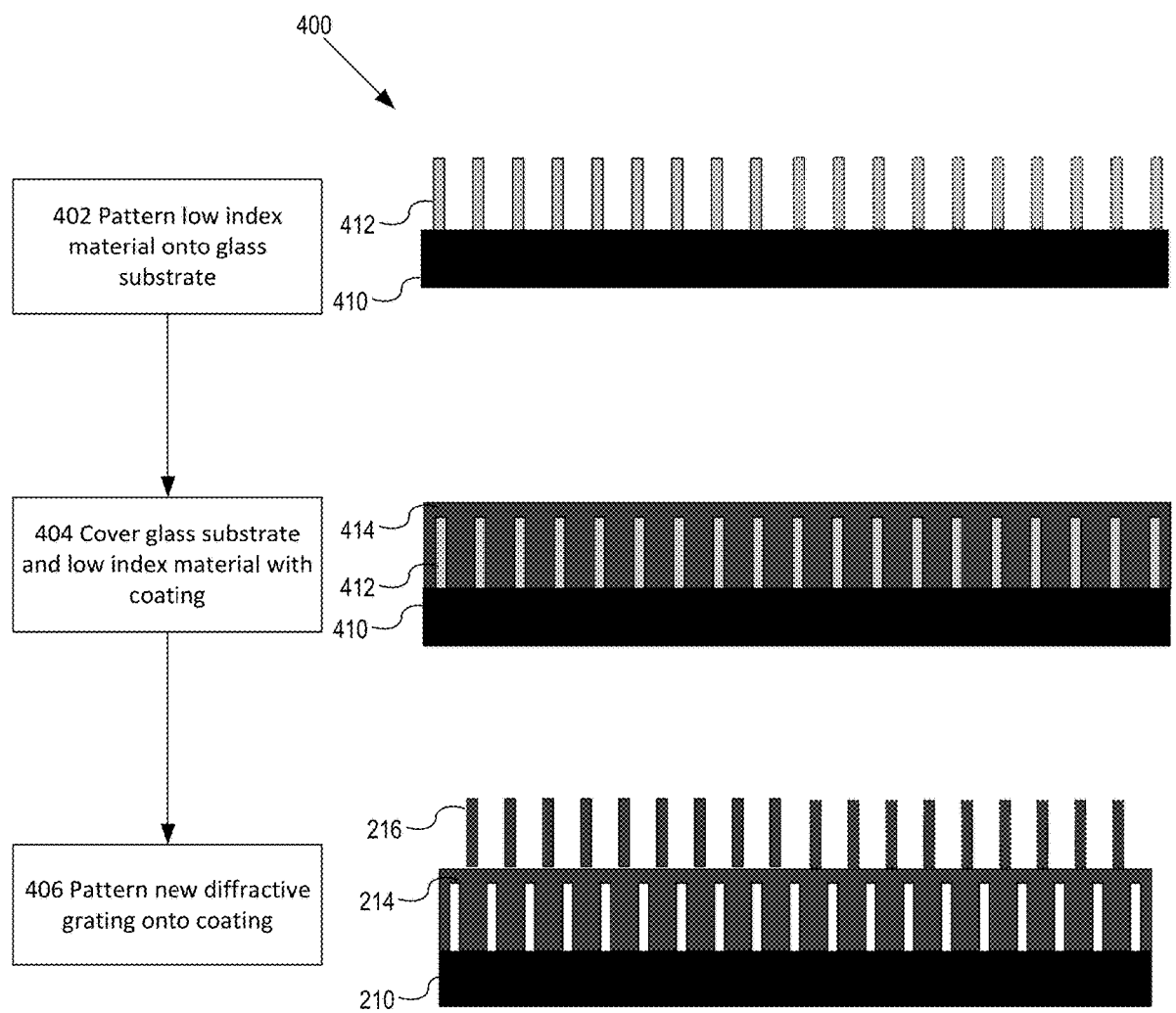
FIG. 4 depicts an example of fabricating a superimposed diffractive grating in an optical element using a low-refractive index material.

FIG. 4 depicts an example of fabricating a superimposed diffractive grating in an optical element using a low-refractive index material. Optical element 400 includes substrate 410. Substrate 410 may comprise a material with a high refractive index for fabricating the buried diffractive grating onto, such as glass or plastic. At step 402, a low index material 412 is patterned onto the substrate. Low index material 412 may comprise a material with a refractive index that is substantially lower than the refractive index of substrate 410, such as lithium fluoride, calcium fluoride, magnesium fluoride, or any other low refractive index optical resin. Substantially lower, as used herein, refers to a difference of 0.5 or greater between the two indices.

The low index material 412 may be patterned onto substrate 410 in any of a plurality of designs, including blazed patterns, slanted patterns, binary patterns, analogue structures, or varying depth structures. Techniques for patterning low index material 412 onto substrate 410 include any of electron beam lithography, interference lithography, nanoimprint lithography, hot embossing, photolithography with a pattern transfer, reactive ion etching and deposition of the low index material, or any other lithography or patterning techniques.

At step 404, a high index coating 414 is applied to cover low index material 412 and substrate 410. High index coating 414 may comprise any of cubic zirconium oxide, titanium oxide, aluminum oxide, diamond, hafnium oxide, tantalum oxide, zinc oxide, or any other high-index resins. In some embodiments, high index coating 414 is selected to have a refractive index that is substantially equal to the refractive index of substrate 410. Processes for coating the high-index coating onto the low index material 412 and substrate 410 include any of physical vapor deposition, atomic layer deposition, chemical vapor deposition, application of nanoparticle inks, spin coating, or dip-coating.

At step 406, a new diffractive grating 416 is patterned onto the high index coating 414. The new diffractive grating 416 may be patterned onto high index coating 414 in any of a plurality of designs, including blazed patterns, slanted patterns, binary patterns, or analogue structures. The design of the new diffractive grating 416 may be a same design as the design of the low index material 412 and/or a different design. Techniques for patterning new diffractive grating 416 onto high index coating 414 include any of electron beam lithography, interference lithography, nanoimprint lithography, hot embossing, photolithography, focused ion beams, or any other lithography or patterning techniques. In some embodiments, the new diffractive grating 416 is fabricated using a transparent conductive material.

The fabrication techniques described herein with respect to FIG. 2-4 provide a wide array of benefits. One such benefit is that buried diffractive gratings can be fabricated in different structures within the optical element, such as blazed structures, slanted structures, binary structures, analogue structures, or varying depth structures. In particular, varying depth structures are not possible with surface relief gratings. In contrast, buried diffractive gratings can be fabricated at different depths depending on need, with some embodiments including buried diffractive gratings in a center of the optical element and other embodiments including buried diffractive gratings closer to one surface of the optical element than the other. In addition, a single diffractive grating can be fabricated with portions of the buried diffractive grating at different depths and/or different buried diffractive gratings in a single optical element can be fabricated at different depths, such as an in-coupling grating at a first depth and an out-coupling grating at a second depth. By combining the buried diffractive grating with a surface relief grating, different types of structures can be used in combination to produce different effects.

Figure 5A:
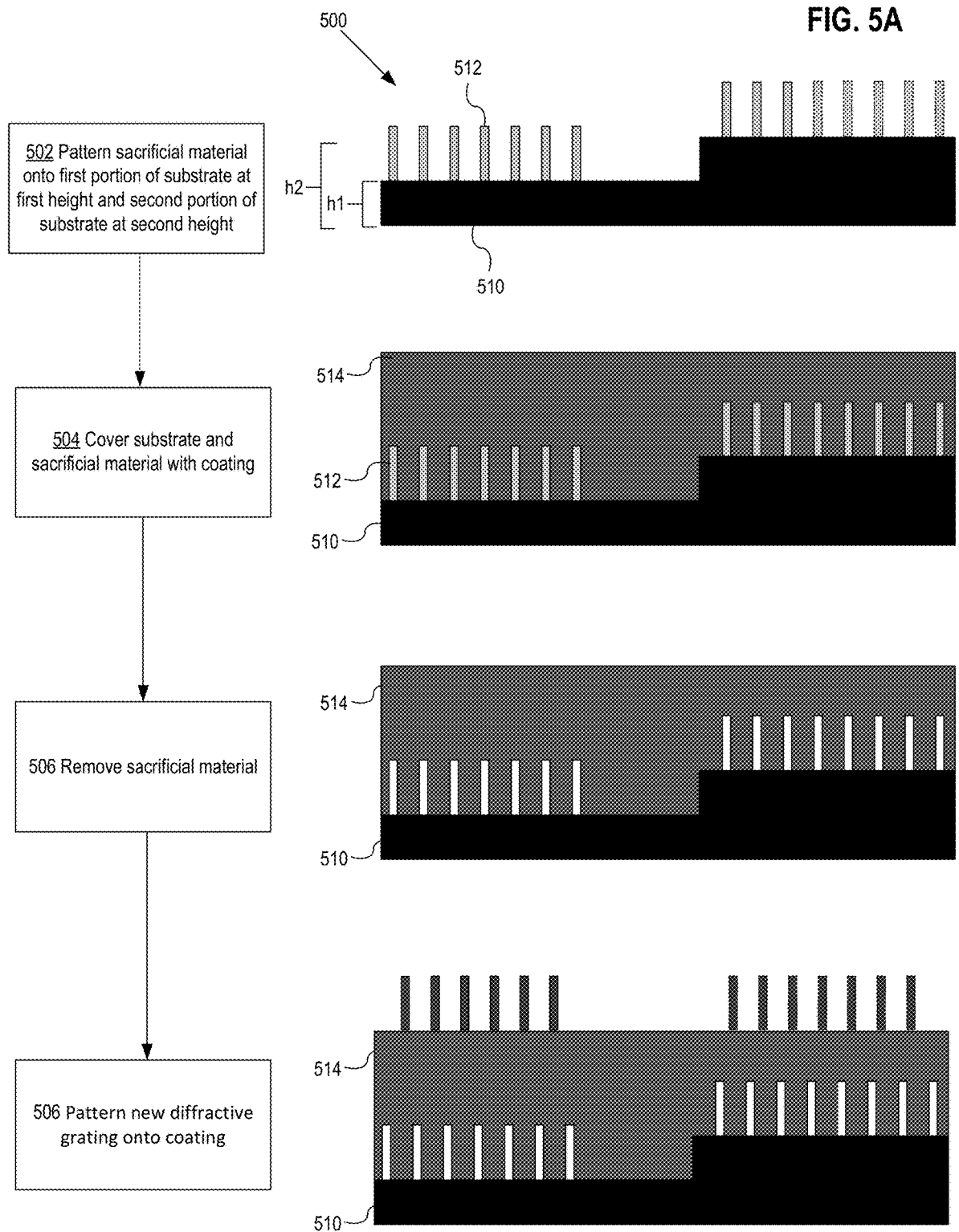
FIG. 5A depicts examples of fabricating a superimposed diffractive grating with a buried diffractive grating at multiple depths in an optical element.

FIG. 5A depicts an example of fabricating a superimposed diffractive grating with a buried diffractive grating at multiple depths in an optical element. Optical element 500 includes substrate 510 at a plurality of varying heights. Substrate 510 may comprise a material with a high refractive index for fabricating the buried diffractive grating onto, such as glass or plastic. Substrate 510 may be fabricated to have varying heights through bonding of multiple pieces of substrate, such as laser bonding of glass, and/or through removal of a portion of the substrate, such as by laser etching or other glass cutting processes. The varying heights may be fabricated in a location designated for a single buried diffractive grating and/or in locations for different buried diffractive gratings such that a first location is a first height and a second location is a second height.

At step 502, sacrificial material 512 is patterned onto the substrate at the plurality of varying heights. Sacrificial material 512 may comprise a soluble or dissolvable material, such as a photoresist, a water-soluble polymer or material, or organic-solvent soluble polymer or material. One example of sacrificial material includes water soluble polyvinyl alcohol.

The sacrificial material 512 may be patterned onto substrate 510 in any of a plurality of designs, including blazed patterns, slanted patterns, binary patterns, analogue structures, or varying depth structures. Techniques for patterning sacrificial material 512 onto substrate 510 include any of electron beam lithography, interference lithography, nanoimprint lithography, hot embossing, photolithography, focused ion beams, or any other lithography or patterning techniques.

At step 504, a high index coating 514 is applied to cover sacrificial material 512 and substrate 510. High index coating 514 may comprise any of cubic zirconium oxide, titanium oxide, aluminum oxide, diamond, hafnium oxide, tantalum oxide, zinc oxide, or any other high-index resins. In some embodiments, high index coating 514 is selected to have a refractive index that is substantially equal to the refractive index of substrate 510. Processes for coating the high-index coating onto the sacrificial material 512 and substrate 510 include any of physical vapor deposition, atomic layer deposition, chemical vapor deposition, application of nanoparticle inks, spin casting, or dip-coating.

At step 506, after the high index coating has been applied to cover sacrificial material 512 and substrate 510, the sacrificial material is removed. For example, a sintering or dissolution process may be applied to optical element 500 to remove sacrificial material.

At step 508, a new diffractive grating 516 is patterned onto the high index coating 514. The new diffractive grating 516 may be patterned onto high index coating 514 in any of a plurality of designs, including blazed patterns, slanted patterns, binary patterns, or analogue structures. The design of the new diffractive grating 416 may be a same design as the design of the sacrificial material 512 and/or a different design. Techniques for patterning new diffractive grating 516 onto high index coating 514 include any of electron beam lithography, interference lithography, nanoimprint lithography, hot embossing, photolithography, focused ion beams, or any other lithography or patterning techniques. In some embodiments, the new diffractive grating 516 is fabricated using a transparent conductive material.

While FIG. 5A depicts a method of fabricating superimposed gratings with varying depth buried diffractive gratings, other embodiments of fabricating a superimposed grating with a varying depth buried diffractive gratings may include laser bonding of glass at different widths, using methods described in respect to FIG. 3, or coating a low index material with a high index material, using methods described in respect to FIG. 4. Additionally, while FIG. 5A depicts a superimposed grating with buried diffractive gratings at different depths, in some embodiments only a strict subset of the different depths is used to create a superimposed diffractive grating. Thus, the superimposed diffractive grating may include a buried diffractive grating that is situated at a different depth than a buried diffractive grating that is not beneath a surface relief grating.

Figure 5B:
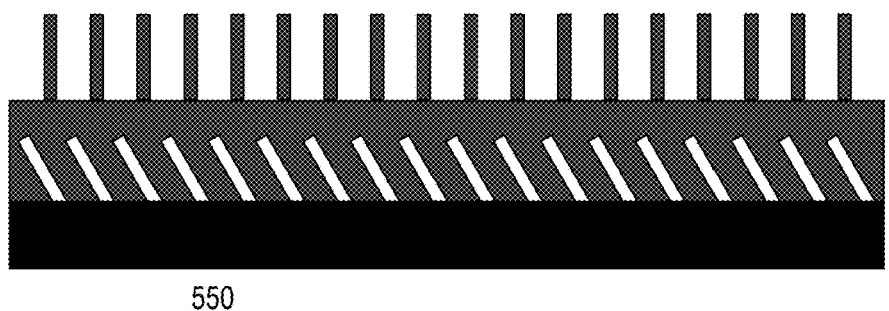
FIG. 5B depicts example structures of superimposed gratings.
Figure 5B:
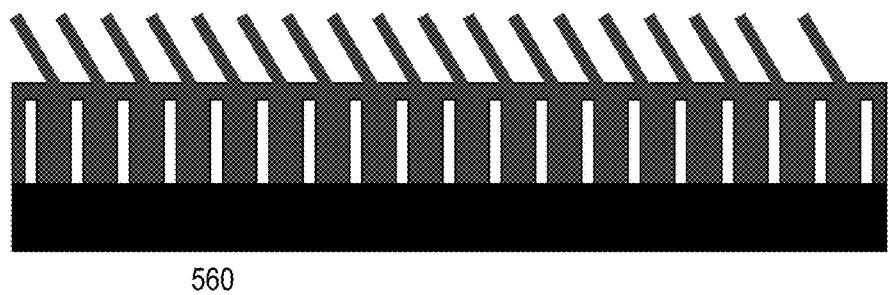
Figure 5B:
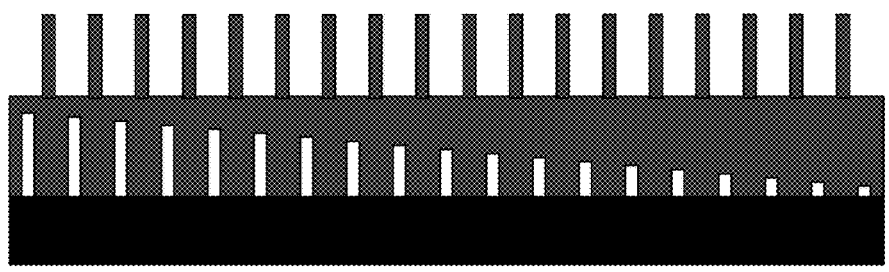
Figure 5B:
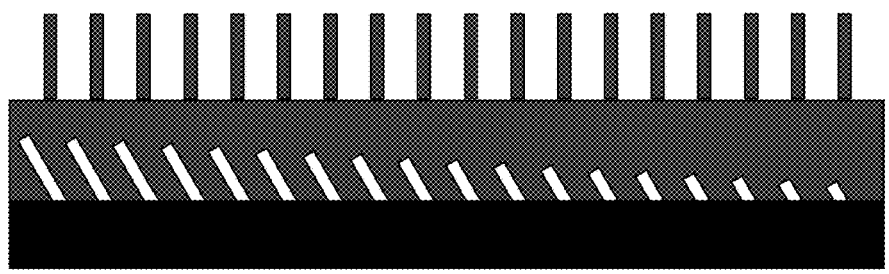

FIG. 5B depicts example structures of superimposed gratings. Structure 550 comprises a superimposed grating comprising a slanted buried diffractive grating with a straight surface relief grating. Structure 560 comprises a straight buried diffractive grating with a slanted surface relief grating. Structure 570 comprises a varying depth diffractive grating with a single depth surface relief grating. Structure 580 comprises a varying depth slanted diffractive grating a single depth straight surface relief grating. As shown in the examples of FIG. 5B, the methods described herein may be used to generate superimposed grating structures with any combination of a variety of surface relief structures and a variety of buried depth structures.

Figure 6:
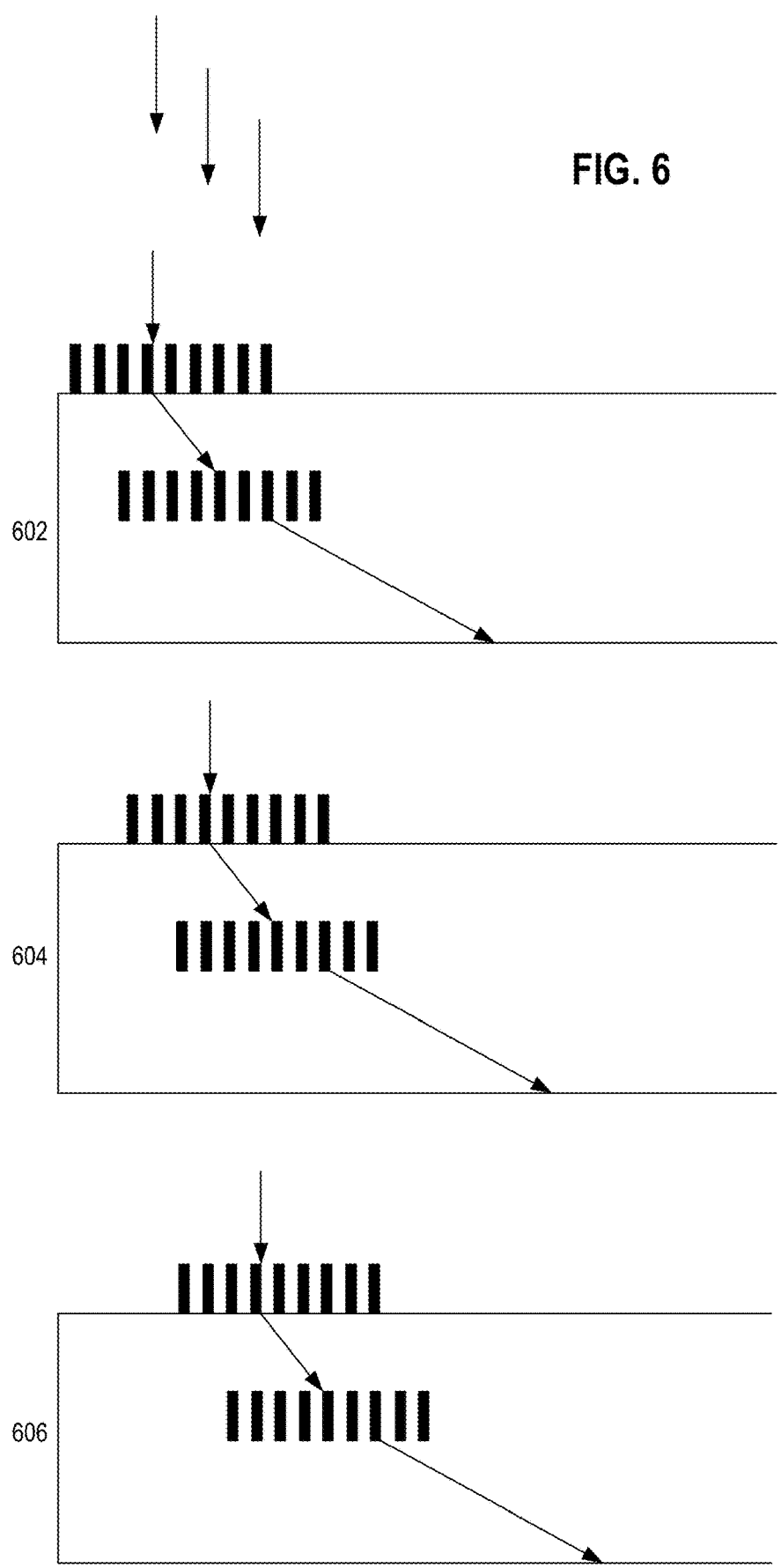
FIG. 6 depicts an example of a plurality of waveguides comprising superimposed diffractive gratings for use in a head-mounted display.

FIG. 6 depicts an example of a plurality of optical elements with superimposed diffractive gratings. While FIG. 6 depicts three optical elements for the purpose of providing a clear example, other embodiments may include fewer or more stacked optical elements. Additionally, while FIG. 6 depicts optical elements for different wavelengths, the combination of optical elements described herein may be used with other types of optical elements, such as optical elements for different focal points.

Optical element combination 600 comprises three optical elements 602, 604, and 606 separated from each other using an air spacing. Each of optical elements 602, 604, and 606 comprise superimposed diffractive gratings. While the superimposed diffractive gratings in FIG. 6 are depicted as being equivalent, other embodiments may include buried diffractive gratings with different structures, at different depths, and/or with different spacings. Each of optical elements 602, 604, and 606 are configured to diffract image beams of different wavelengths. For example, optical element 602 may comprise a waveguide configured to diffract an image beam with a wavelength of 465 nm, optical element 604 may comprise a waveguide configured to diffract an image beam with a wavelength of 530 nm, and optical element 606 may comprise a waveguide configured to diffract an image beam with a wavelength of 630 nm. Thus, a head-mounted display may provide each of the image beams to the different waveguides, thereby providing a full color image to an eye of a viewer.

In some embodiments, a superimposed diffractive grating comprises two buried diffractive gratings at different depths. For example, a first buried diffractive grating may be fabricated onto a substrate using any of steps 202-206 of FIG. 2, 302-304 of FIG. 3, or 402-404 of FIG. 4. A second buried diffractive grating may then be fabricated on top of the first buried diffractive grating using any of the aforementioned methods. With both diffractive gratings of the superimposed grating comprising buried diffractive gratings, the surfaces of the waveguide may comprise flat surfaces onto which an angular sensitive coating and one or more other coatings or lenses may be applied. Additionally, or alternatively, a third diffractive grating comprising a surface relief grating may be fabricated onto the surface of the waveguide, thereby creating a triple superimposed grating.

Figure 7:
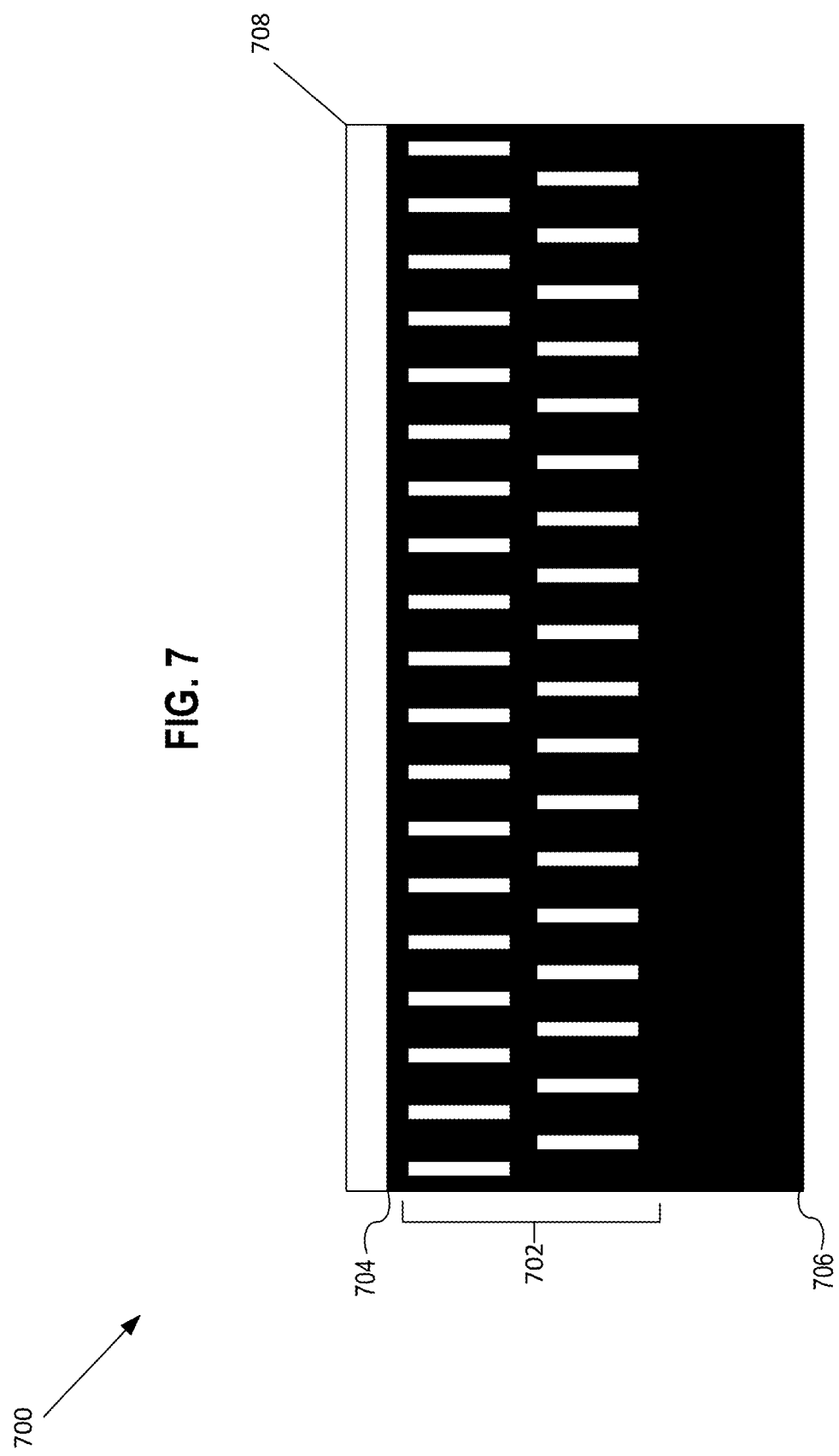
FIG. 7 depicts an optical element comprising a superimposed buried diffractive grating and an additional coating.

FIG. 7 depicts an optical element comprising a superimposed diffractive grating comprising two buried diffractive gratings and an additional coating. Optical element 700 comprises superimposed buried diffractive gratings 702, surface 704, and surface 706. Surface 704 and surface 706 comprise substantially flat surfaces that are substantially parallel to each other. Surface 704 and surface 706 may comprise a same material, such as glass or plastic, or different materials, such as glass with a high-refractive index coating that has a substantially equal refractive index to the glass. Additional coating 708 comprises a material that is used to coat surface 704 after fabrication of the buried diffractive grating and/or is coated on top of an angular-sensitive reflective coating which is coated on top of the surface. Additional coating may comprise a wax or polish, an anti-reflective coating, such as magnesium fluoride, a high-reflection coating, such as a combination of zinc sulfide or titanium dioxide with magnesium fluoride or silicon dioxide, a transparent conductive coating, such as indium tin oxide, or any other coating material.

In some embodiments, a coating is used to provide an optical isolation of the waveguide and other appended optical elements, such as lenses. The coating may comprise an angular-sensitive reflective coating that maintain operation of the waveguide at the angles at which light is expected to strike the surface based on the diffractive gratings. The angular-sensitive layer effectively isolates the waveguide operation at the relevant angles allowing other optical elements to be attached to the surface over the coating. Examples of additional optical elements include ophthalmic lenses, photochromic or electrochromic lenses, dynamic or active operated lenses, polarized lenses, or other lenses. In some embodiments, the angular-sensitive reflective coating is used in conjunction with the additional coatings described above, such that the pseudo-air layer is placed between the optical element and the additional coating.

Figure 8:
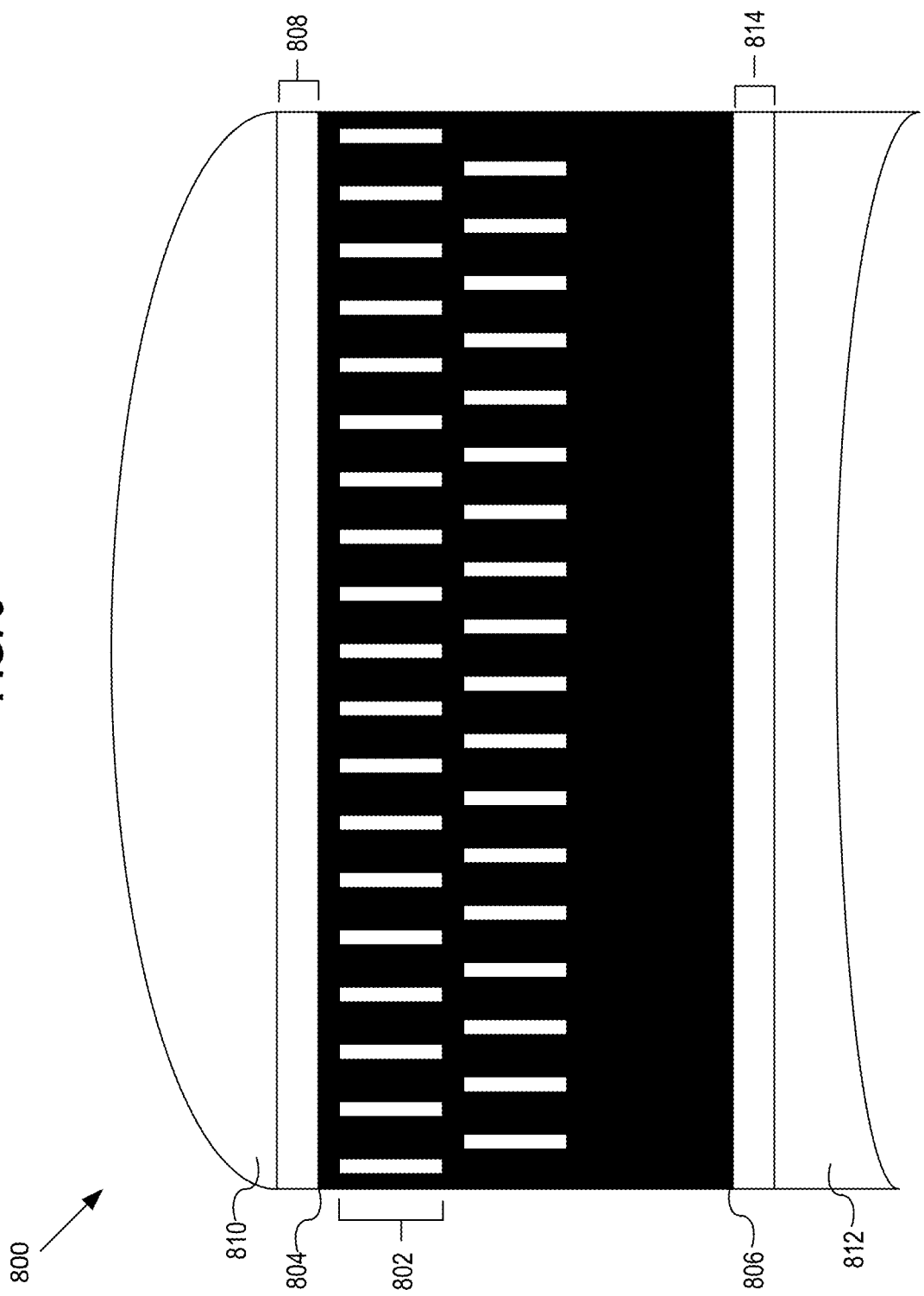
FIG. 8 depicts an optical element comprising a superimposed buried diffractive grating and additional coatings that allow other optical elements to be attached to the optical element comprising the buried diffractive grating.

FIG. 8 depicts an optical element comprising superimposed buried diffractive gratings and additional coatings that allow other optical elements to be attached to the optical element comprising the superimposed buried diffractive gratings. Optical element 800 comprises superimposed buried diffractive grating 802, surface 804, and surface 806. Surface 804 and surface 806 comprise substantially flat surfaces that are substantially parallel to each other. Surface 804 and surface 806 may comprise a same material, such as glass or plastic, or different materials, such as glass with a high-refractive index coating that has a substantially equal refractive index to the glass. Each of surface 804 and surface 806 is coated with an angular sensitive coating to provide layers 808 and 814 (respectively), acting as a pseudo-air layers. The pseudo-air layers 808 and 814 allow the waveguide to continue to operate as if surface 804 and surface 806 were surrounded with a substance with a low refractive index, such as air or gas.

Convex lens 810 and concave lens 812 comprise two examples of ophthalmic lenses that may be used in conjunction with optical element 800 that are attached to the flat surface of optical element 800 on the pseudo-air layers 808 and 814 made up of the angular-sensitive coating. Convex lens 810 comprises a lens with a rounded surface and a flat surface which is separated from surface 804 by pseudo-air layer 808. Similarly, concave lens 812 comprises a lens with a rounded surface and a flat surface which is separated from surface 806 by pseudo-air layer 814. Other embodiments may include a single optical element attached to optical element 800 and separated by one of pseudo-air layers 808 or 814. Additionally, embodiments may include different types of optical elements attached to optical element 800 and separated by one of pseudo-air layers 808 or 814, such as photochromic or electrochromic lenses, actively operated lenses, polarized lenses, or other lenses.

Figure 9:
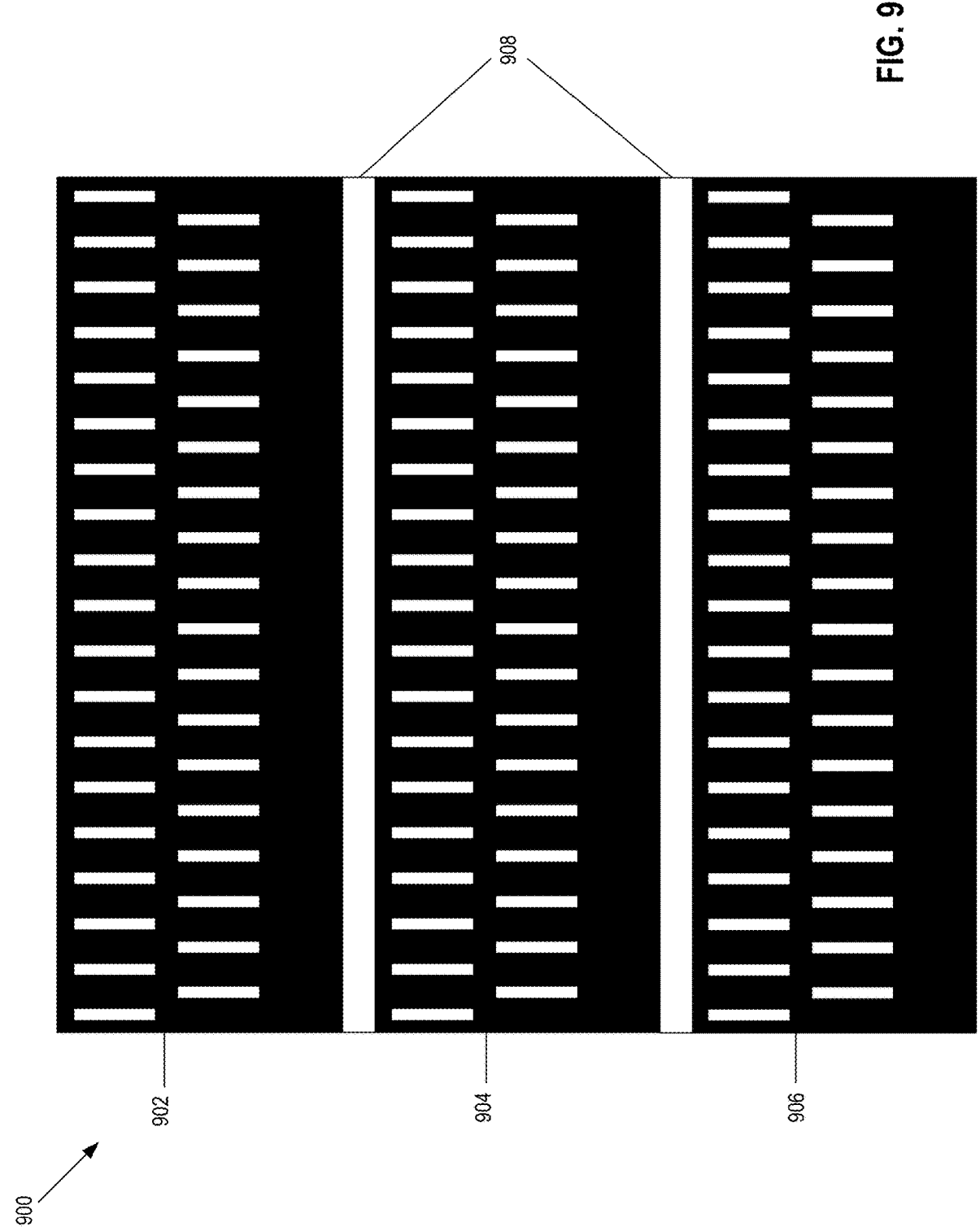
FIG. 9 depicts an example of a plurality of stacked optical elements with superimposed buried diffractive gratings.

In some embodiments, an angular sensitive coating is used to separate waveguides comprising superimposed buried diffractive gratings. The use of the buried diffractive gratings in the superimposed diffractive gratings allows the waveguides to be stacked on top of each other, thereby creating a compact set of waveguides which can be used to provide a plurality of images, such as images at different focal points or images at different frequencies. FIG. 9 depicts an example of a plurality of stacked optical elements with buried diffractive gratings. While FIG. 9 depicts three stacked optical elements for the purpose of providing a clear example, other embodiments may include fewer or more stacked optical elements. Additionally, while FIG. 9 depicts optical elements for different wavelengths, the combination of optical elements described herein may be used with other types of optical elements, such as optical elements for different focal points. The combination of waveguides described with respect to FIG. 9 may additionally be combined with other embodiments, including additional lenses, such as the ophthalmic lenses of FIG. 8, or other types of coatings, such as anti-reflective coatings.

Optical element combination 900 comprises three optical elements 902, 904, and 906 separated by an angular sensitive layer coating 908. Each of optical elements 902, 904, and 906 comprise superimposed buried diffractive gratings. While the buried diffractive gratings in FIG. 9 are depicted as being equivalent, other embodiments may include buried diffractive gratings with different structures, at different depths, and/or with different spacings. Each of optical elements 902, 904, and 906 are configured to diffract image beams of different wavelengths. For example, optical element 902 may comprise a waveguide configured to diffract an image beam with a wavelength of 465 nm, optical element 904 may comprise a waveguide configured to diffract an image beam with a wavelength of 530 nm, and optical element 906 may comprise a waveguide configured to diffract an image beam with a wavelength of 630 nm. Thus, a head-mounted display may provide each of the image beams to the different waveguides, thereby providing a full color image to an eye of a viewer.

FIG. 10 depicts an example of a head-mounted display comprising one or more optical elements with a buried diffractive grating. Head-mounted display 1000 comprises optical element 1002, image source 1004, control circuitry 1008, memory 1010, network adaptor 1012, and power source 1014. Optical element 1002 comprises an optical element, such as a lens, which sits in front of an eye of a user. Image source 1004 provides an image beam 1006 to the optical element which is diffracted by a buried diffractive grating and displayed to the eye of the user. Control circuitry 1008 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., quad-core). Control circuitry 1008 may be configured to generate one or more images for display through the head-mounted display and instruct image source 1004 to produce one or more image beams corresponding to the one or more images. Memory 1010 may be any device for storing electronic data, such as random-access memory, solid state devices, quantum storage devices, hard disk drives, non-volatile memory or any other suitable fixed or removable storage devices, and/or any combination of the same. Memory 1010 may store data defining images for display by the head-mounted display. Network adaptor 1012 comprises circuitry that connects the head-mounted display to one or more other devices over a network. Network adaptor 1012 may comprise wires and/or busses connected to a physical network port, e.g. an ethernet port, a wireless WiFi port, cellular communication port, or any other type of suitable physical port. Power source 1014 comprises a source of power to the image source 1004, control circuitry 1008, memory 1010, and/or network adaptor 1012, such as a battery, solar generator, or wired power source.

What is claimed is:

1. A display comprising:
    an image source configured to provide an image beam;
    an optical element comprising an in-coupling grating and an out-coupling grating, the in-coupling grating comprising:
        (a) a first diffractive grating stacked in contact with a second diffractive grating, wherein the image beam diffracted by the first diffractive grating is further diffracted by the second diffractive grating before further propagating through the optical element;
    wherein the optical element is configured to convert the image beam into an output image by diffracting the beam through the in-coupling grating, propagating the image beam through the optical element through internal reflection, and diffracting the image beam by the out-coupling grating through a surface of the optical element.

2. The display of claim 1, wherein a pattern of the first diffractive grating differs from a pattern of the second diffractive grating.

3. The display of claim 1, wherein the first diffractive grating comprises a surface relief grating fabricated with a transparent conductive material.

4. The display of claim 1, wherein the second diffractive grating comprises a first buried diffractive grating at a first depth within the optical element and a second buried diffractive grating at a second depth, different than the first depth, within the optical element.

5. The display of claim 1, further comprising a lens coupled to the optical element, wherein the lens is separated from a flat surface of the optical element by an angular-sensitive reflective coating.

6. The display of claim 1, wherein the optical element is a first optical element, and the display further comprises:
    a second optical element;
    wherein a flat surface of the first optical element is separated from a flat surface of the second optical element by an angular-sensitive reflective coating;
    wherein the image source is configured to provide a first image beam at a first wavelength to the first optical element and a second image beam at a second wavelength to the second optical element.

7. The display of claim 1, wherein the optical element is a first optical element, and the display further comprises:
    a second optical element;
    wherein a flat surface of the first optical element is separated from a flat surface of the second optical element by an angular-sensitive reflective coating;
    wherein the first optical element is configured to output the image at a first focal focus and the second optical element is configured to output the image at a second focal focus.

8. The display of claim 1, wherein the out-coupling grating comprises:
    a third diffractive grating superimposed at least in part over a fourth diffractive grating such that the image beam is diffracted by the third diffractive grating and the fourth diffractive grating before exiting the optical element.

9. The display of claim 1, wherein the optical element is configured to convert the image beam into an output image by:
    receiving the image beam at the in-coupling grating of the optical element which diffracts the image beam towards an expansion grating of the optical element;
    expanding the image beam by the expansion grating of the optical element and transmitting the beam from the expansion grating to an out-coupling grating;
    diffracting the expanded image beam by the out-coupling grating towards an eyeball of a user of the display.

10. The display of claim 1, wherein the second diffractive grating comprises a plurality of nonsolid pockets interspaced with a material, wherein the material has a refractive index that is substantially equal to a refractive index of a surface of the optical element through which the image beam enters the optical element or is substantially equal to a refractive index of a surface of the optical element through which the image beam leaves the optical element.

11. The display of claim 1, wherein the first diffractive grating and the second diffractive grating diffract the image beam at different angles.

12. A display comprising:
    an image source configured to provide an image beam;
    an optical element comprising an in-coupling grating and an out-coupling grating, the out-coupling grating comprising:
        (a) a first diffractive grating stacked in contact with a second diffractive grating wherein the image beam diffracted by the second diffractive grating is further diffracted by the first diffractive grating before exiting the optical element and wherein the second diffractive grating comprises a first buried diffractive grating at a first depth within the optical element and a second buried diffractive grating at a second depth, different than the first depth, within the optical element;

wherein the optical element is configured to convert the image beam into an output image by diffracting the beam through the in-coupling grating, propagating the image beam through the optical element through internal reflection, and diffracting the image beam by the out-coupling grating through a surface of the optical element.

13. The display of claim 12, wherein a pattern of the first diffractive grating differs from a pattern of the second diffractive grating.

14. The display of claim 13, wherein the first diffractive grating comprises a surface relief grating fabricated with a transparent conductive material.

15. The display of claim 12, further comprising a lens coupled to the optical element, wherein the lens is separated from a flat surface of the optical element by an angular-sensitive reflective coating.

16. The display of claim 12, wherein the optical element is a first optical element and the display further comprises:
a second optical element;
wherein a flat surface of the first optical element is separated from a flat surface of the second optical element by an angular-sensitive reflective coating;
wherein the image source is configured to provide a first image beam at a first wavelength to the first optical element and a second image beam at a second wavelength to the second optical element.

17. The display of claim 12, wherein the optical element is a first optical element and the display further comprises:
a second optical element;
wherein a flat surface of the first optical element is separated from a flat surface of the second optical element by an angular-sensitive reflective coating;
wherein the first optical element is configured to output the image at a first focal focus and the second optical element is configured to output the image at a second focal focus.

18. The display of claim 12, wherein the optical element is configured to convert the image beam into an output image by:
receiving the image beam at the in-coupling grating of the optical element which diffracts the image beam towards an expansion grating of the optical element;
expanding the image beam by the expansion grating of the optical element and transmitting the beam from the expansion grating to an out-coupling grating;
diffracting the expanded image beam by the out-coupling grating towards an eyeball of a user of the display.

19. The display of claim 12, wherein at least one of the first buried diffractive grating or the second buried diffractive grating comprises a plurality of nonsolid pockets interspaced with a material, wherein the material has a refractive index that is substantially equal to a refractive index of a surface of the optical element through which the image beam enters the optical element or is substantially equal to a refractive index of a surface of the optical element through which the image beam leaves the optical element.

20. The display of claim 1, wherein the first diffractive grating superimposed at least in part over the second diffractive grating is configured such that a portion of the image beam diffracted by the first diffractive grating is further diffracted by the second diffractive grating.

21. The display of claim 1, wherein the optical element is a waveguide consisting of a material uniform throughout the waveguide.

22. The display of claim 21, wherein the first diffractive grating is buried within the waveguide and the second diffractive grating extends away from an outer surface of the waveguide.

* * * * *